(12) United States Patent
Yan

(10) Patent No.: US 11,496,318 B1
(45) Date of Patent: Nov. 8, 2022

(54) DATABASE LAYER CACHING FOR VIDEO COMMUNICATIONS

(71) Applicant: Intrado Corporation, Omaha, NE (US)

(72) Inventor: Edward Yan, Evanston, IL (US)

(73) Assignee: Intrado Corporation, Omaha, NE (US)

( * ) Notice: Subject to any disclaimer, the term of this patent is extended or adjusted under 35 U.S.C. 154(b) by 0 days.

(21) Appl. No.: 17/382,817

(22) Filed: Jul. 22, 2021

Related U.S. Application Data

(63) Continuation of application No. 17/379,177, filed on Jul. 19, 2021.

(51) Int. Cl.
H04L 9/32 (2006.01)
G06F 16/2455 (2019.01)
G06F 21/60 (2013.01)

(52) U.S. Cl.
CPC ...... *H04L 9/3242* (2013.01); *G06F 16/24552* (2019.01); *G06F 21/602* (2013.01); *H04L 9/3213* (2013.01)

(58) Field of Classification Search
CPC .............. H04L 9/3242; H04L 9/3213; G06F 16/24552; G06F 21/602
See application file for complete search history.

(56) References Cited

U.S. PATENT DOCUMENTS

| 1,292,083 | A | 1/1919 | Sawyer |
| 1,805,640 | A | 5/1931 | Shindel |
| 2,084,897 | A | 6/1937 | Dym |
| 2,294,561 | A | 9/1942 | Kimball |
| 2,386,175 | A | 10/1945 | Charles |
| 5,533,503 | A | 7/1996 | Doubek et al. |
| 5,635,978 | A | 6/1997 | Alten et al. |
| 6,889,325 | B1 * | 5/2005 | Sipman ................. H04L 63/126 380/37 |
| 7,653,921 | B2 * | 1/2010 | Herley ................ H04N 21/4332 382/199 |
| 7,913,326 | B1 | 3/2011 | Barrows |
| 7,991,770 | B2 | 8/2011 | Covell et al. |
| 8,190,435 | B2 | 5/2012 | Wang et al. |
| 8,462,982 | B2 | 6/2013 | Colaitis et al. |
| 8,510,770 | B1 * | 8/2013 | Oztaskent .............. H04H 60/72 709/201 |
| 9,119,708 | B2 | 9/2015 | Wanderer et al. |
| 10,560,728 | B2 * | 2/2020 | Cain .................. H04N 21/2365 |
| 2002/0072982 | A1 | 6/2002 | Barton et al. |

(Continued)

OTHER PUBLICATIONS

U.S. Appl. No. 17/379,177, filed Jul. 19, 2021, Database Layer Caching for Video Communications.

(Continued)

*Primary Examiner* — Michael B. Pierorazio
(74) *Attorney, Agent, or Firm* — Patent Capital Group

(57) ABSTRACT

An apparatus includes a storage, a network interface, and a processor. The storage is to store content within a webcast or a virtual event. The network interface transmits a CDN token key and receives a client content request including a content hash and a message authentication code. The processor performs a decryption of the message authentication code, at least in part based on the CDN token key, and performs a reverse hash on the content hash to obtain a content ID that identifies the content. The network interface transmits the content, at least in part based on the content ID.

20 Claims, 9 Drawing Sheets

(56) References Cited

U.S. PATENT DOCUMENTS

| | | | |
|---|---|---|---|
| 2004/0055009 A1 | 3/2004 | Hayashida | |
| 2004/0143349 A1 | 7/2004 | Roberts et al. | |
| 2004/0163110 A1* | 8/2004 | Won | H04N 21/4314 725/50 |
| 2005/0028195 A1* | 2/2005 | Feinleib | H04N 21/4316 725/135 |
| 2005/0144455 A1 | 6/2005 | Haitsma | |
| 2005/0192863 A1 | 9/2005 | Mohan | |
| 2006/0098159 A1 | 5/2006 | Canavan et al. | |
| 2006/0224452 A1 | 10/2006 | Ng | |
| 2006/0256133 A1 | 11/2006 | Rosenberg | |
| 2007/0124756 A1 | 5/2007 | Covell et al. | |
| 2007/0179850 A1 | 8/2007 | Ganjon et al. | |
| 2007/0212019 A1 | 9/2007 | Kimura et al. | |
| 2008/0049704 A1* | 2/2008 | Witteman | H04H 60/58 370/342 |
| 2008/0082510 A1* | 4/2008 | Wang | H04H 60/40 |
| 2009/0313670 A1 | 12/2009 | Takao | |
| 2010/0114713 A1 | 5/2010 | Anderson | |
| 2011/0071838 A1 | 3/2011 | Wang et al. | |
| 2011/0129114 A1* | 6/2011 | Colaitis | H04N 19/70 382/100 |
| 2011/0273455 A1 | 11/2011 | Powar et al. | |
| 2011/0283319 A1* | 11/2011 | Davis | H04N 21/41265 725/39 |
| 2012/0295560 A1 | 11/2012 | Mufti | |
| 2012/0297400 A1 | 11/2012 | Hill et al. | |
| 2012/0316969 A1 | 12/2012 | Metcalf, III | |
| 2013/0029762 A1 | 1/2013 | Klappert | |
| 2013/0031579 A1 | 1/2013 | Klappert | |
| 2013/0042262 A1 | 2/2013 | Riethmueller | |
| 2013/0044051 A1 | 2/2013 | Jeong | |
| 2013/0067512 A1 | 3/2013 | Dion et al. | |
| 2013/0073366 A1 | 3/2013 | Heath | |
| 2013/0073377 A1 | 3/2013 | Heath | |
| 2013/0080242 A1 | 3/2013 | Alhadeff et al. | |
| 2013/0080262 A1 | 3/2013 | Scott | |
| 2013/0085828 A1 | 4/2013 | Schuster | |
| 2013/0111519 A1 | 5/2013 | Rice et al. | |
| 2013/0124073 A1 | 5/2013 | Ren | |
| 2014/0115761 A1 | 5/2014 | McNeal et al. | |
| 2014/0196070 A1 | 7/2014 | Moskowitz et al. | |
| 2015/0082349 A1 | 3/2015 | Ishtiaq et al. | |
| 2015/0143416 A1* | 5/2015 | Onno | H04N 21/43072 725/34 |
| 2015/0216710 A1 | 8/2015 | Wanderer et al. | |
| 2015/0222950 A1 | 8/2015 | Sant et al. | |
| 2015/0229979 A1* | 8/2015 | Wood | H04N 21/251 725/14 |
| 2016/0037215 A1* | 2/2016 | Cardona | H04N 21/234309 725/31 |
| 2016/0205428 A1* | 7/2016 | McDonough | H04N 21/4524 725/31 |
| 2018/0184160 A1* | 6/2018 | Cain | H04N 21/44016 |
| 2018/0343481 A1* | 11/2018 | Loheide | H04L 67/1097 |
| 2018/0367637 A1* | 12/2018 | Balazinski | H04L 67/02 |
| 2019/0313161 A1* | 10/2019 | Wilms | H04L 9/0643 |
| 2019/0356966 A1 | 11/2019 | Zuydervelt et al. | |

OTHER PUBLICATIONS

U.S. Appl. No. 17/384,242, filed Jul. 23, 2021, Database Layer Caching for Video Communications.

* cited by examiner

| Company Name | Lobby | Theater | Lounge | Games | Exhibit Hall | Sponsors | Resources | Profile | Help |
|---|---|---|---|---|---|---|---|---|---|

210

220

| Live & Upcoming | On Demand |
|---|---|
| Break-out Session 1:30pm – 2:15pm | Break-out Session 1:30pm – 2:15pm |
| Social Media Demonstration 2:30pm – 3pm | |
| Marketing Demonstration 8:15am – 8:45am | |
| Analyst Demonstration 9:30am – 10am | |

DATABASE LAYER CACHING FOR VIDEO COMMUNICATIONS

CROSS-REFERENCE TO RELATED APPLICATION

This application is a continuation of U.S. patent application Ser. No. 17/379,177 filed on Jul. 19, 2021 and entitled "DATABASE LAYER CACHING FOR VIDEO COMMUNICATIONS," which is hereby incorporated by reference herein in its entirety.

BACKGROUND

Technical Field

This disclosure relates to retrieving digital information stored in a content delivery network and, in particular, where the digital information is static content for a studio webcast or a virtual event.

Related Art

Conventional video communication software distributes video content to small audiences, such as in a videoconference. This software is often proprietary to a particular company and, therefore, requires installation and configuration of the software by members of the audience.

Because the videoconference has relatively few audience members, the videoconference host might ask the audience members to install and configure the proprietary software. If the audience members are affiliated with the same business, then the business can provide technical support for configuring the software.

In some situations, it is unreasonable to ask audience members to install the proprietary software for the videoconference. Similarly, it can be unreasonable to provide technical support for the proprietary software in some situations. These situations include large environments, such as trade shows, professional conferences, university student orientations, and videoconferences with thousands of employees of transnational companies across separately-configured networks.

In these situations, the environment hosts might provide content via common software, such as a web browser. This content can be provided through studio webcasting and/or virtual events.

A virtual event simulates a physical presence in a virtual place similar to the real world, such as a trade show, a business convention, a conference, or a sales meeting. A virtual event can include, for example, virtual booths, show floors or show rooms, custom navigation capabilities, or studio webcasts.

A studio webcast is an audio or video presentation for internal and external audiences. The audience can receive the studio webcast via a browser, without software such as Adobe Flash. The studio webcast can include video programs using multiple video sources, including screen shares.

In addition, Content Delivery Networks (CDNs) are traditionally employed to serve static unchanging content. Studio webcasting and virtual events often do not include CDNs.

BRIEF SUMMARY

In a large event, similar or identical requests from audiences can be expressed to allow a CDN to cache the results of database queries, greatly reducing contention on the database. Additionally, this system can incorporate security into the retrieval of cached information, so that there is no degradation of security by using the CDN.

BRIEF DESCRIPTION OF THE SEVERAL VIEWS OF THE DRAWINGS

FIG. 2 illustrates an exemplary screen shot of a virtual event.

DETAILED DESCRIPTION

Figure 1:
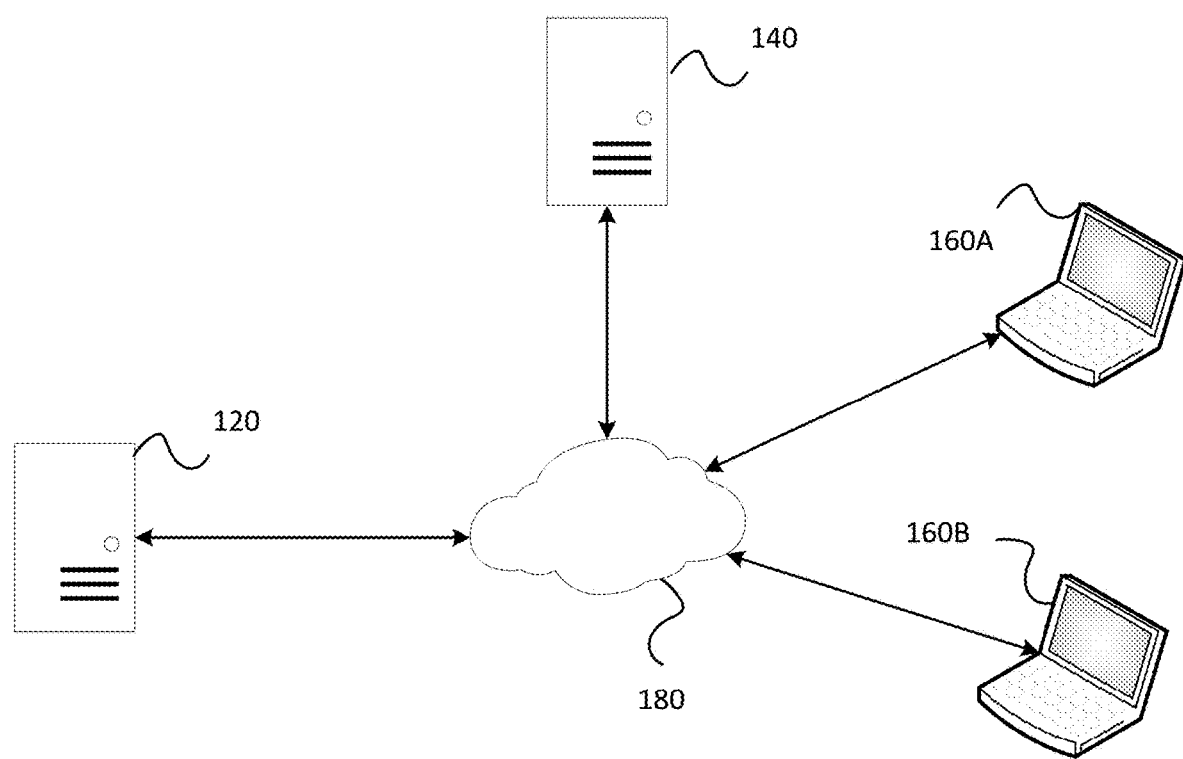
FIG. 1 illustrates an exemplary network including a host, a content delivery network, and clients according to an implementation of the present disclosure.

FIG. 1 illustrates an exemplary network including a host, a content delivery network, and clients according to an implementation of the present disclosure. As illustrated in FIG. 1, host 120, CDN 140, and clients 160A, 160B are connected via network 180.

Host 120, CDN 140, and clients 160A, 160B include, for example, computing devices.

Although host 120 and CDN 140 each are illustrated as a single computing device, host 120 and CDN 140 typically include more than one computing device. The computing devices of CDN 140 are typically separated by a network to provide geographic proximity to a diverse array of clients 160A, 160B.

Clients 160A, 160B are labeled individually to provide context for this disclosure. In most implementations, there are a greater number of clients than the two clients 160A, 160B. When it is not necessary to specify an individual client, clients 160A, 160B are referred to as client 160.

Network 180 is a network of an unspecified numbers of computers. Network 180 can be, for example, the Internet or an intranet.

Conventionally, clients 160A, 160B directly communicate with host 120 of an environment, such as a studio webcast and/or a virtual event. These communications involve a company key, a show UUID (universally unique identifier), an event key, a user key, and a user type.

The company key identifies a tenant of the host 120 and is, for example, a sponsor of the environment. The company key is static and is tied to the tenant.

The show UUID is a randomized, unique string that represents the environment in which the clients 160A, 160B are participating. The show UUID generally differs for each environment.

The event key is data associated to a specific presentation within the environment. The event key generally differs for each environment.

The user key is a user-specific value identifying a user of client 160A or a user of client 160B.

The user type identifies a type of the user of client 160A or of the user of client 160B. The user type is, for example, a sponsor representative, a presenter, or one or more levels of attendee (e.g., normal or premium).

The host 120 can assign the user key and the user type when a user of client 160 registers for the environment with the host 120. The user key and the user type do not change per login. The user type can change during an event.

Very large audiences attending webcasts or virtual events tend to request data from a database of the host 120 at the same time. For example, clients 160A, 160B can request static content, such as a video, at the same time. This sudden traffic can easily overwhelm the database of the host 120 for short periods of times, resulting in noticeable slowdown in response times.

FIG. 2 illustrates an exemplary screen shot of a virtual event. The screen shot of FIG. 2 shows a Live & Upcoming tab 210 and an On Demand tab 220.

In a common implementation, an On Demand video is an example of the static content requested by clients 160A, 160B.

The static content is not limited to an On Demand video. For example, the static content can be an audio file, an image, a program (e.g., a game or an application), source code, a text file, or any other content.

Figure 3:
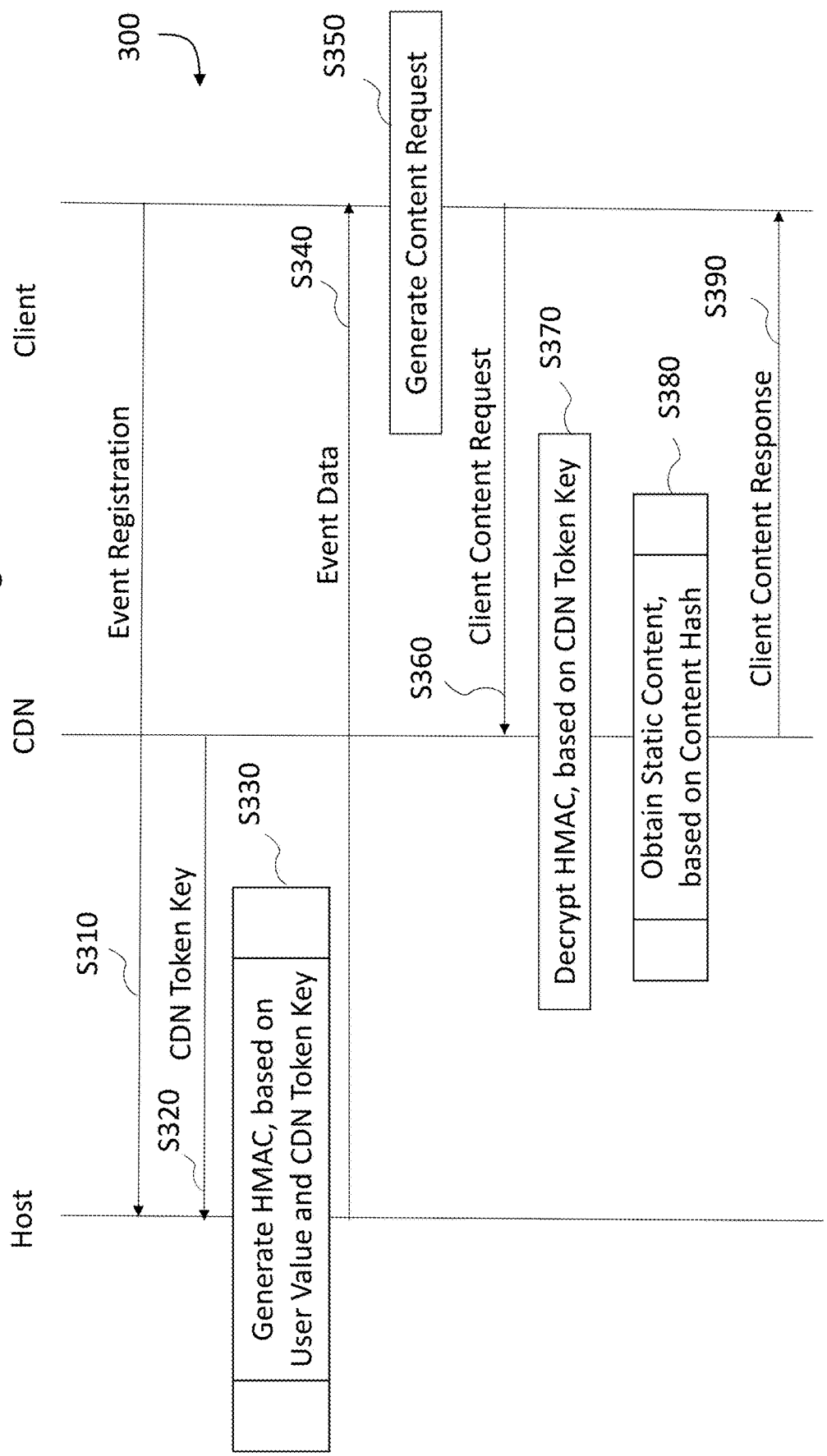
FIG. 3 illustrates a signal flow for database layer caching in a studio webcast or a virtual event, according to an implementation of the present disclosure.

FIG. 3 illustrates a signal flow for database layer caching in a studio webcast or a virtual event, according to an implementation of the present disclosure. Signal flow 300 begins at S310, where the client 160 can transmit an event registration indicating an event ID and an address of the client 160. The event registration can also include a user ID identifying a user of the client 160. The host 120 receives the event registration from the client 160.

The host 120 can generate a user value. For example, the user value can be based on the user ID. In implementations in which the client 160 does not transmit a user ID, the host 120 can assign an arbitrary (e.g., random or sequential) user value. In particular, the host 120 determines a user key for the user ID. The host 120 determines a show UUID for the event ID. The host 120 can also determine a user type based on the event ID and, in some implementations, the user ID. Signal flow 300 then advances to S320.

In S320, the CDN 140 assigns and transmits a CDN token key to the host 120. In some implementations, the CDN token key is a static value retrieved by the host 120. Signal flow 300 then advances to S330.

In S330, the host 120 generates a hash-based message authentication code (HMAC), based on the user value and the CDN token key. In some implementations, the host 120 generates the HMAC also based on a content hash.

The host 120 can determine the company key and the event key, based on the event ID. The host 120 can determine the content IDs and language locales therefor, based on the show UUID. The language locale is the language in which the static content is to be presented to the user of the client 160.

The host 120 can generate the content hash, based on the show UUID, the company key, the event key, and a content ID. For example, the host 120 concatenates the show UUID, the company key, the event key, and the content ID to produce a respective content hash concatenation. The host 120 then generates a respective Base 64 hash of the respective content hash concatenation to produce the respective content hash.

In some implementations, the host 120 generates the respective content hash additionally based on the language locale. In such an implementation, the language locale is additionally concatenated within the respective content hash concatenation.

Data within the respective content hash concatenation can be concatenated in any predetermined order (e.g., with the show UUID second-to-last, rather than first).

The host 120 then can generate an access control list (ACL), based on the user value. The host 120 generates the ACL also based on the respective content hashes for the static contents in the event.

For example, if the event includes only one static content, then the ACL includes at least a portion of a Uniform Resource Locator (URL) (e.g., a text string) identifying the user value and the content hash.

If the event includes more than one static content, then the ACL can include the user value and the content hashes for the static contents. In some implementations, if the event includes an unknown amount of static content, the content hash can be represented by a wildcard character.

The host 120 then hashes the ACL with the CDN token key to generate the HMAC. In one implementation, this hashing is based on Secure Hash Algorithm (SHA) 256.

Signal flow 300 then advances to S340.

In S340, the host 120 transmits event data, for example, to the address of the client 160. The event data can include the company key, the show UUID, the event key, the user value, and the HMAC. The event data also includes one or more content IDs identifying static content within the environment. In some implementations, the event data also includes preview images and/or content titles for the static content. In some implementations, the event data includes an address of the CDN 140. In some implementations, the event data includes the user key and user type. The event data optionally includes the language locale for the static content. The client 160 receives the event data.

In S350, the client 160 generates a client content request for the selected static content. If only one static content is available for access in this environment, then the client 160 generates the client content request for the one static content. If more than one static content is available in this show, then the client 160 generates the client content request for the selected static content. Of course, the client 160 can also generate the client content request for more than one of the static contents.

The client content request includes a content hash and an address of the client 160.

In one implementation, the client produces the content hash by combining the show UUID, the company key, the event key, the content ID of the selected static content, and the language locale (optionally). For example, the combining is a concatenation. The concatenation is not limited to this order. In addition, other forms of combining the show UUID, the company key, the event key, and the content ID to generate the content hash are possible. The client 160 then produces the content hash by hashing the combined data using a reversible hash, e.g., Base 64.

The client 160 can combine (e.g., concatenate) the user key, the user type, and the show UUID. The concatenation is not limited to this order. In addition, other forms of combining the user key, user type, and show UUID are possible. The client 160 can take a reversible hash, e.g., Base 64, over the combined data to produce the user value.

The signal flow 300 then advances to S360.

In S360, the client 160 transmits the client content request to the CDN 140. The client content request includes the user value and the content hash. The client content request can also include the HMAC and an address of the client 160. The CDN 140 receives the client content request from the client. The signal flow 300 then advances to S370.

In S370, the CDN 140 extracts the HMAC, the content hash, and the user value from the client content request.

The CDN 140 decrypts the HMAC using the CDN Token Key to produce a decryption result. The CDN 140 performs an operation on the decryption result to produce one or more operation results. This operation generally is the reverse operation performed by the host 120 in producing the HMAC. For example, if the host 120 generated the HMAC by concatenating the content hash and the user, then the CDN 140 splits the decryption result into the one or more operation results.

The CDN 140 determines whether the one or more operation results match (e.g., are the same as) the content hash and the user value included in the client content request. If the one or more operation results do not match the content hash and the user value, then the CDN 140 determines the client content request is invalid. Thus, the CDN 140 can ignore the client content request. In this way, the CDN 140 can verify the user of client 160 has been authorized to retrieve the static content by the host 120.

If the CDN 140 determines the one or more operation results match the content hash and the user value included in the client content request, then the CDN 140 can determine the content request is valid. The CDN 140 then determines whether a storage of the CDN 140 is storing the static content, based on the content hash. For example, the CDN 140 performs a reverse hash function on the content hash to produce a reverse hash result. The CDN 140 then performs a reverse operation of the reverse hash result, such as splitting the reverse hash result, to produce the content ID (and, optionally, the language locale). The CDN 140 then determines whether a local storage is storing the static content associated with the content ID (and, optionally, the language locale). For example, the static content can be named with the content ID or be tagged with the content ID.

If the CDN 140 determines the local storage includes the static content, then the CDN 140 transmits the static content in a client content response in S390.

Returning to S380, if the CDN 140 determines the local storage does not include the content, then the CDN 140 transmits a CDN content request to an address of host 120. The CDN content request includes the content hash, the user value, and an address of the CDN 140. In some implementations, the CDN content request includes the HMAC.

The host 120 receives the CDN content request. In some implementations, the host 120 checks the validity of the CDN content request based on the HMAC, in a similar manner to how the CDN 140 checks the validity of the client content request based on the HMAC in S370. If the host 120 determines the HMAC is invalid, then the CDN content request is invalid. Thus, in some implementations, the host 120 can perform an error operation. In some implementations, the error operation includes transmitting an error message to the address of the CDN 140 that the CDN content request is invalid. In various implementations, the error operation includes transmitting a notification to an event administrator. In other implementations, the error operation is taking no action, e.g., to avoid inadvertent participation in a distributed denial-of-service (DDOS) attack.

If the host 120 does not determine the CDN content request is invalid (e.g., if the host 120 does not check the validity of the CDN content request or if the host 120 determines the CDN content request is valid), then the host 120 validates the client 160 based on the user value. For example, the host 120 can determine whether the user value or user key identifies a valid registrant for the environment associated with the event key or show UUID. If the user value or user key does not identify a valid registrant, then the host 120 performs an error operation, such as one of the above error operations.

The host 120 determines the static content based on the content ID. Some implementations additionally include the language locale as a basis for the determination.

In some implementations, the host 120 determines whether the user is authorized to receive the content, based on the user value or user type. For example, in some implementations, the host 120 can determine a normal attendee receives access to public static content, and the host 120 can determine a presenter receives access to public content and behind-the-scenes static content for their presentation software. In some implementations, the host 120 can determine a sponsor representative receives access to public content and behind-the-scenes content. The host 120 can determine a premium user receives additional content.

If the host 120 determines the user key is valid and, in some implementations, that the user type is authorized to receive the static content, then the host 120 transmits a CDN content response to the address of the CDN 140. The CDN content response includes the static content (optionally, in the language of the language locale) and the content ID. The CDN 140 then receives the CDN content response. Thus, CDN 140 can obtain the static content. Thus, CDN 140 can store the static content and tag or otherwise associate the static content with the content ID.

In S390, the CDN 140 transmits a client content response to the address of the client 160. The client content response includes the static content. The client 160 receives the client content response.

The client 160 can then reproduce the content on a user output interface, such as a display.

Figure 4:
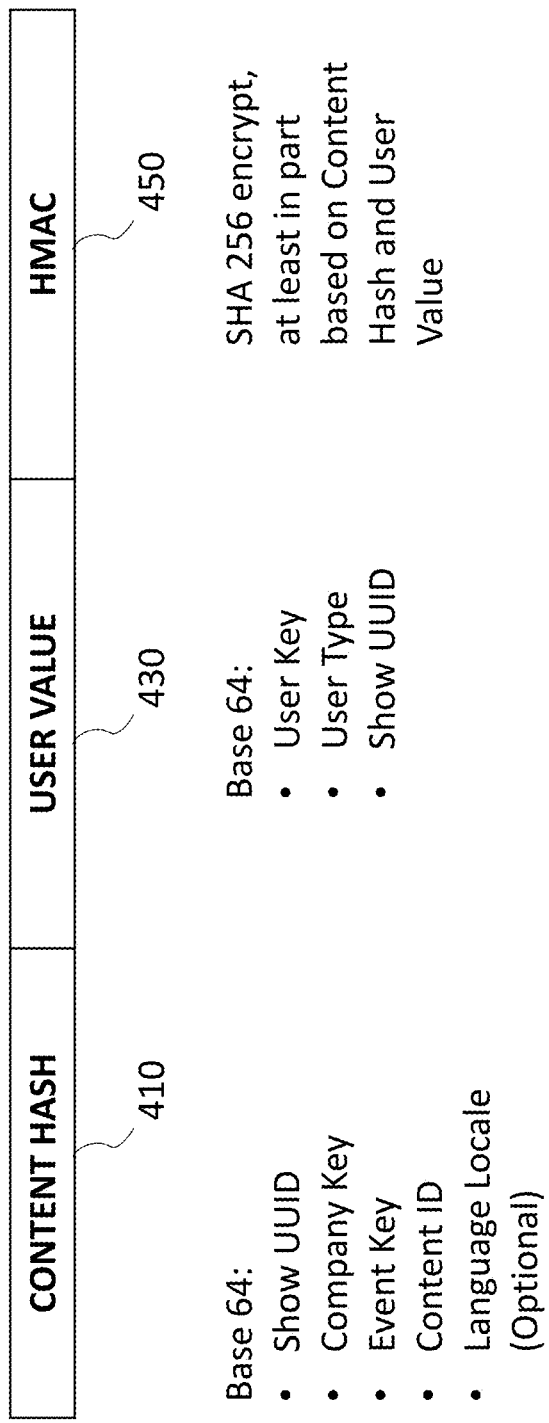
FIG. 4 illustrates a data structure, according to an implementation of the present disclosure.

FIG. 4 illustrates a data structure for a client content request, according to an implementation of the present disclosure. For example, the data structure can be included in the client content request transmitted in S360.

As shown in FIG. 4, the data structure includes a content hash field 410, a user value field 430, and an HMAC field 450. The data structure illustrated in FIG. 4 is exemplary. In some implementations, the client content request sets forth the fields as strings in a Hypertext Transfer Protocol (HTTP) request or in a web request header.

The content hash field 410 includes a Base 64 hash of the show UUID, the company key, the event key, and the content ID. In some implementations, the Base 64 hash is also taken of the language locale.

The user value field 430 includes a Base 64 hash of the user key, the user type, and the show UUID.

The HMAC field 450 includes a hash of the ACL and the CDN token key. The access control list includes the user value. The access control list can include one or more content hashes.

Figure 5:
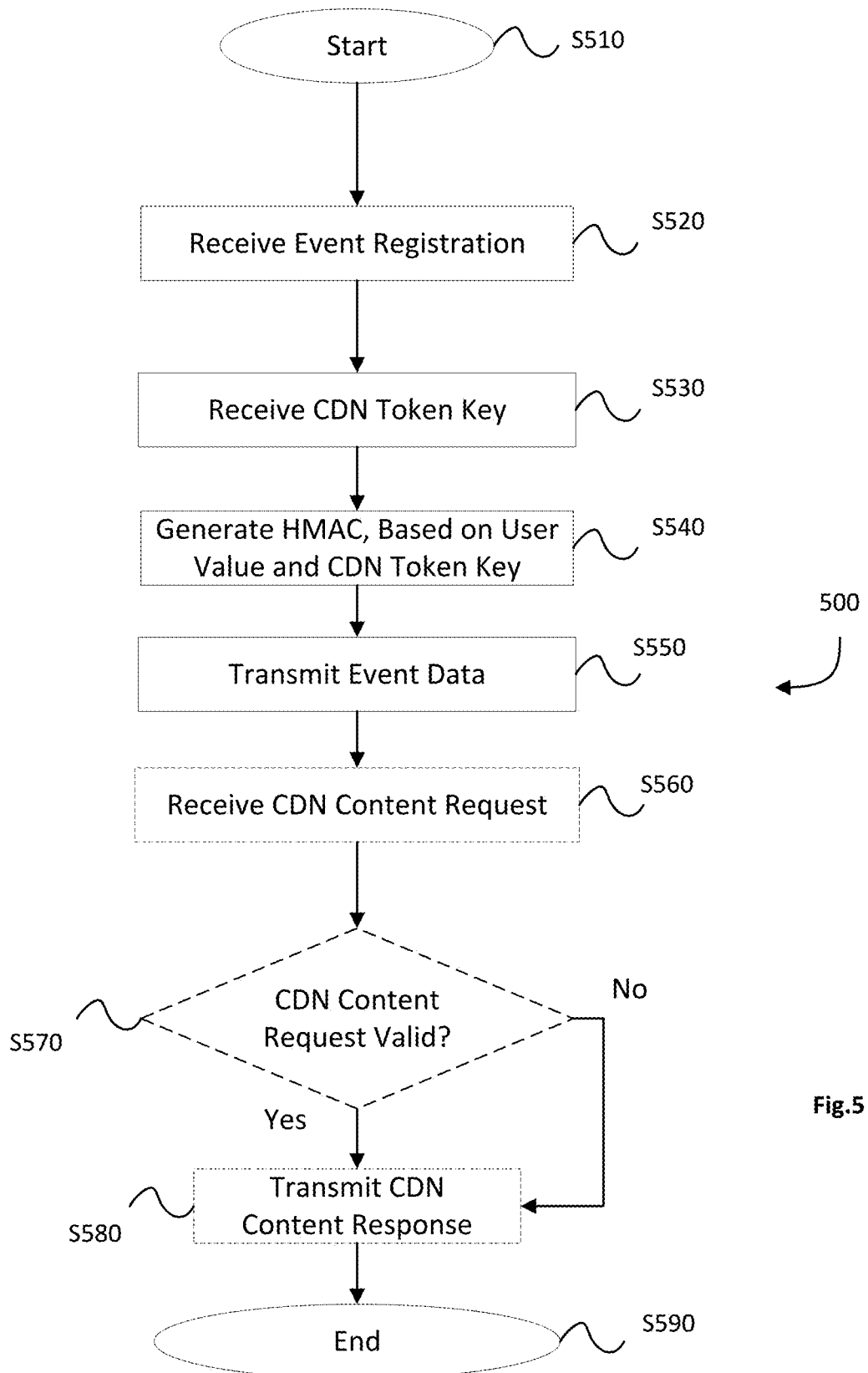
FIG. 5 illustrates an algorithm performed by a host for database layer caching, according to an implementation of the present disclosure.

FIG. 5 illustrates an algorithm 500 performed by the host 120 for database layer caching, according to an implementation of the present disclosure.

The algorithm 500 begins in S510 and proceeds to S520. In S520, a network interface of the host 120 receives an event registration from, for example, the client 160. The event registration can include a user ID of a user of the client 160 and an address of the client 160. The algorithm 500 then advances to S530.

In S530, the network interface of the host 120 receives a CDN token key from, for example, the CDN 140. In some implementations, the host 120 first transmits a token key request to the CDN 140 to provide the CDN token key. The CDN token key request can include an address of the host 120. The host 120 then receives a CDN token key response including the CDN token key.

In some implementations, a user output interface outputs the CDN token key to a user of the host 120. For example, a display of the host 120 can display the CDN token key to the user of the host 120. The user of the host 120 can then manually input the CDN token key using a user input interface, such as a keyboard. In other implementations, the CDN token key is input to the host 120 without the intervention of a user.

The algorithm 500 then advances to S540.

In S540, a processor of the host 120 generates the HMAC. As discussed above, a processor of the host 120 can generate the user value based on the user ID. The processor of host 120 can also generate content hashes based on the one or more content IDs of static content within the environment. The processor of the host 120 can generate the ACL based on the user value and, in some implementations, the one or more content hashes. The processor of the host 120 hashes the ACL with the CDN token key to generate the HMAC. In one implementation, the processor of the host 120 performs this hashing based on SHA-256. The algorithm 500 then advances to S550.

In S550, the network interface of the host 120 transmits the event data to the address of the client 160. The event data can include the company key, the show UUID, the event key, the user value, and the HMAC. In some implementations, the event data includes the user key and user type instead of, or in addition to, the user value.

The network interface can save on the amount of data transferred by sending the show UUID, company key, event key, and content IDs, rather than by sending content hashes for the static content. This savings arises because the show UUID, company key, and event key can be the same for the content IDs, but the content hashes would be different. In some implementations, the network interface can transfer the content hashes instead of the show UUID, company key, event key, and content IDs, to reduce the processing by the client 160.

The algorithm 500 then advances to S560.

In S560, the network interface of the host 120 can receive a CDN content request. For example, if the static content is determined to not be stored in a local cache of CDN 140, the host 120 can receive the CDN content request. The CDN content request can include the address of the CDN 140. The algorithm 500 then advances to S570.

In S570, the processor of the host 120 determines whether the CDN content request is valid. As discussed above, the processor of the host 120 can determine whether the HMAC is valid, whether the content hash and the user value are valid, and whether the static content is authorized to be accessed by the user type of the user of client 160. If the processor of the host 120 determines the CDN content request is not valid, the algorithm 500 advances to S590. If the processor of the host determines the CDN content request is valid, then the algorithm 500 advances to S580.

In S580, the network interface of the host 120 transmits the CDN content response to the address of the CDN 140. The CDN content response can include the static content. The algorithm 500 then advances to S590.

The algorithm 500 concludes in S590.

Figure 6:
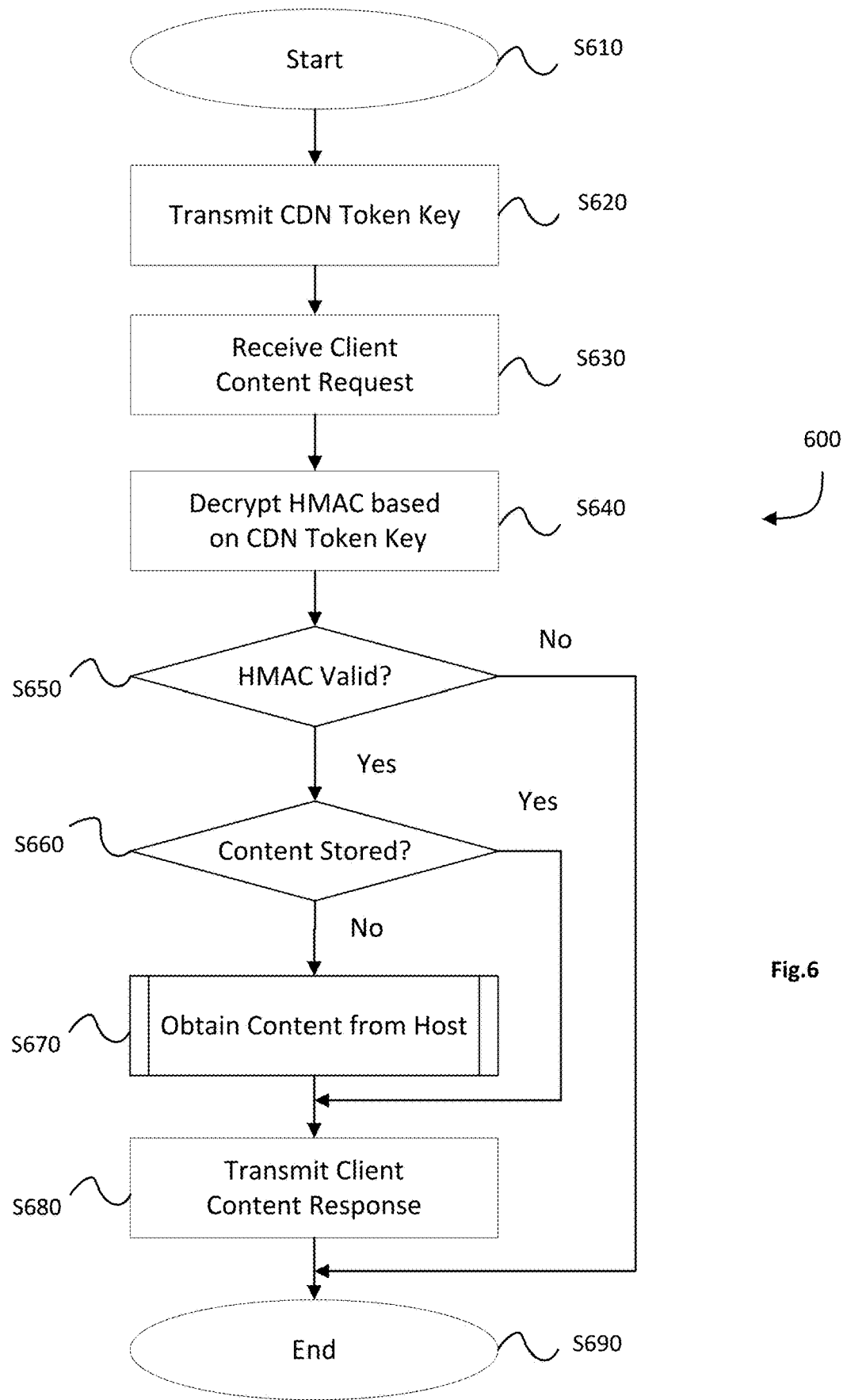
FIG. 6 illustrates an algorithm performed by a content delivery network for database layer caching, according to an implementation of the present disclosure.

FIG. 6 illustrates an algorithm 600 performed by the CDN 140 for database layer caching, according to an implementation of the present disclosure.

The algorithm 600 begins at S610 and proceeds to S620. In S620, a network interface of the CDN 140 transmits the CDN token key to the host 120. For example, the network interface of the CDN 140 can receive a token key request including an address of the host 120. The CDN 140 can transmit a token key response including the CDN token key to the address of the host 120. The algorithm 600 then advances to S630.

In S630, the CDN 140 receives a client content request, for example, from the client 160. The client content request includes the content hash, the user value, the HMAC, and the address of the client 160. In some implementations, the client content request includes the address of the host 120. The algorithm 600 then advances to S640.

In S640, the processor of the CDN 140 decrypts the HMAC based on the CDN token key. For example, the processor of the CDN 140 decrypts the HMAC to produce a decrypted content hash and a decrypted user value. The algorithm 600 then advances to S650.

In S650, the processor of the CDN 140 determines whether the HMAC is valid. For example, the processor of the CDN 140 can determine the HMAC is invalid, because the HMAC has too many or too few characters. In other examples, the processor of the CDN 140 can determine the HMAC is invalid, because the decrypted content hash does not match (e.g., is the same as) the received content hash or the decrypted user value does not match (e.g., is the same as) the received user value.

If the processor of the CDN 140 determines the HMAC value is not valid, then the algorithm 600 advances to S690 and concludes. If the processor of the CDN 140 determines the HMAC is valid, the algorithm 600 advances to S660.

In S660, the processor of the CDN 140 determines the content ID, based on the content hash, and whether the static content identified by the content ID is cached locally. For example, content requests from client 160A and client 160B for the same static content can have different user values but the same content hash. If the processor of the CDN 140 determines the content having the content ID is cached locally in a storage, then the algorithm 600 advances to S680. If the processor of the CDN 140 determines the content is not cached locally in a storage, then the algorithm 600 advances to S670.

In S670, the CDN 140 obtains the content from the host 120.

For example, the network interface of the CDN 140 transmits the CDN content request to the address of the host 120. The CDN content request includes the content hash and the user value. In some implementations, the CDN content request includes the HMAC. The CDN content request can also include the address of the CDN 140.

The network interface of the CDN 140 then receives the CDN content response. Typically, the CDN content response includes the content. In some implementations, the CDN content response includes an address (e.g., a URL) at which the content can be obtained. The network interface of the CDN 140 can then request and receive the content from the URL. The CDN 140 can locally cache the static content in a storage and tag the static content with the content ID. The algorithm 600 then advances to S680.

In S680, the network interface of the CDN 140 transmits the client content response to the address of the client 160. The client content response includes the requested content. The algorithm 600 then advances to S690 and concludes.

Figure 7:
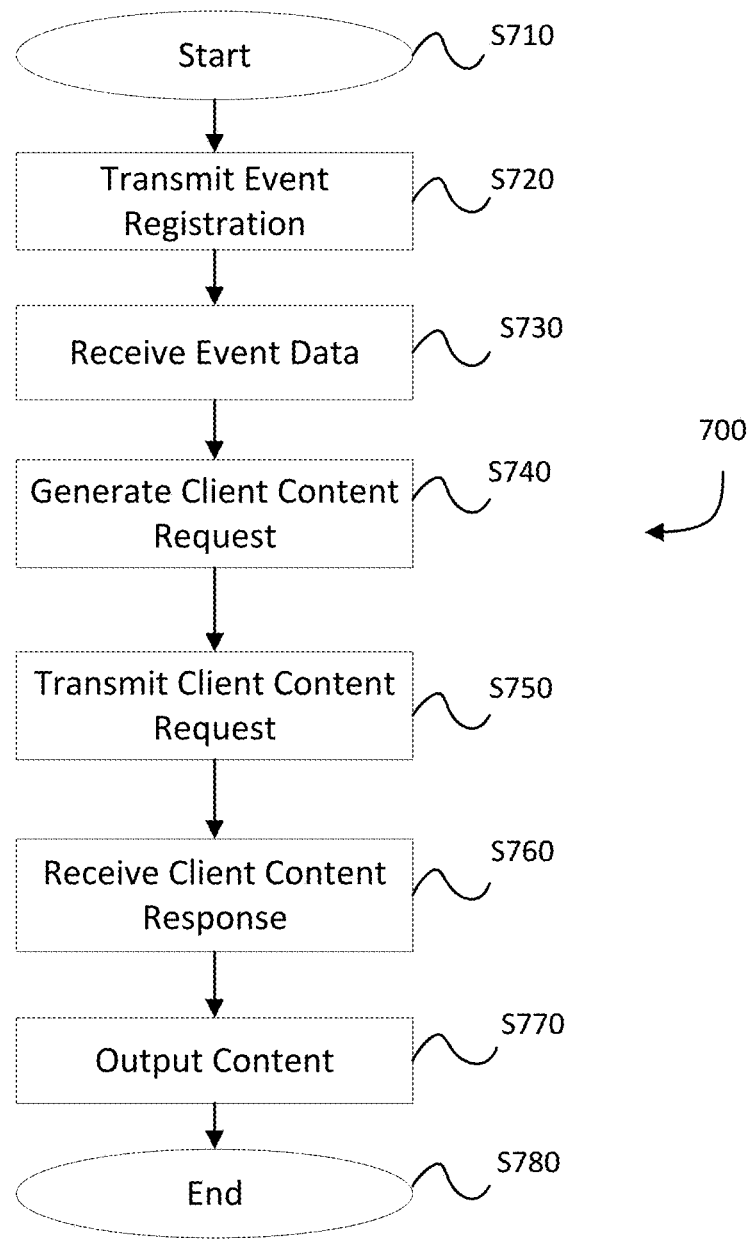
FIG. 7 illustrates an algorithm performed by a client for database layer caching, according to an implementation of the present disclosure.

FIG. 7 illustrates an algorithm 700 performed by the client 160 for database layer caching, according to an implementation of the present disclosure.

The algorithm 700 begins at S710 and advances to S720.

In S720, a network interface of the client 160 transmits an event registration to an address of the host 120. The event registration can include a user ID identifying a user of the client 160. The event registration includes an address of the client 160. In some implementations, the event registration includes an event ID to identify an event. The algorithm 700 then advances to S730.

In S730, the network interface of the client 160 receives the event data from the host 120. The event data can include the company key, the show UUID, the event key, the user value, and the HMAC. The event data also includes one or more content IDs. In some implementations, the event data also includes preview images and/or content titles. The event data optionally includes a language locale for the content. In some implementations, the event data includes the user key and user type instead of, or in addition to, the user value. The algorithm 700 then advances to S740.

In S740, a processor of the client 160 generates a client content request. The client 160 can begin this generation process by displaying, on a display of client 160, the preview images and/or content titles of the event. In some implementations, the user of client 160 can use a user input interface to select one of the preview images and/or content titles. The processor of the client 160 determines the content ID for the selected preview image and/or content title.

In one implementation, the processor of the client 160 produces the content hash by combining the show UUID, the company key, the event key, and the content ID. In some implementations, the processor of the client 160 produces the content hash by combining the language locale in addition. In one example, the combining is a concatenation. The concatenation is not limited to this order. In addition, other forms of combining the show UUID, the company key, the event key, and the content ID are possible. The processor of the client 160 then produces the content hash by taking a hash over the combined data using a reversible hash, e.g., Base 64.

In some implementations in which the event data does not include the user value, the processor of the client 160 can combine (e.g., concatenate) the user key, the user type, and the show UUID. Concatenation is not limited to this order. In addition, other forms of combining the user key, user type, and show UUID are possible. The processor of the client 160 can take a reversible hash, e.g., Base 64, over the combined data to produce the user value.

The client content request includes the content hash, the user value, the HMAC, and the address of the client 160. The algorithm 700 then advances to S750.

In S750, the network interface of the client 160 transmits the client content request to the address of the CDN 140. The algorithm 700 then advances to S760.

In S760, the network interface of the client 160 receives the client content response. The client content response includes the static content. The algorithm 700 then advances to S770.

In S770, a user output interface of the client 160 outputs the elected static content. For example, a display of the client 160 can display a video. The algorithm 700 then advances to S780 and concludes.

Figure 8:
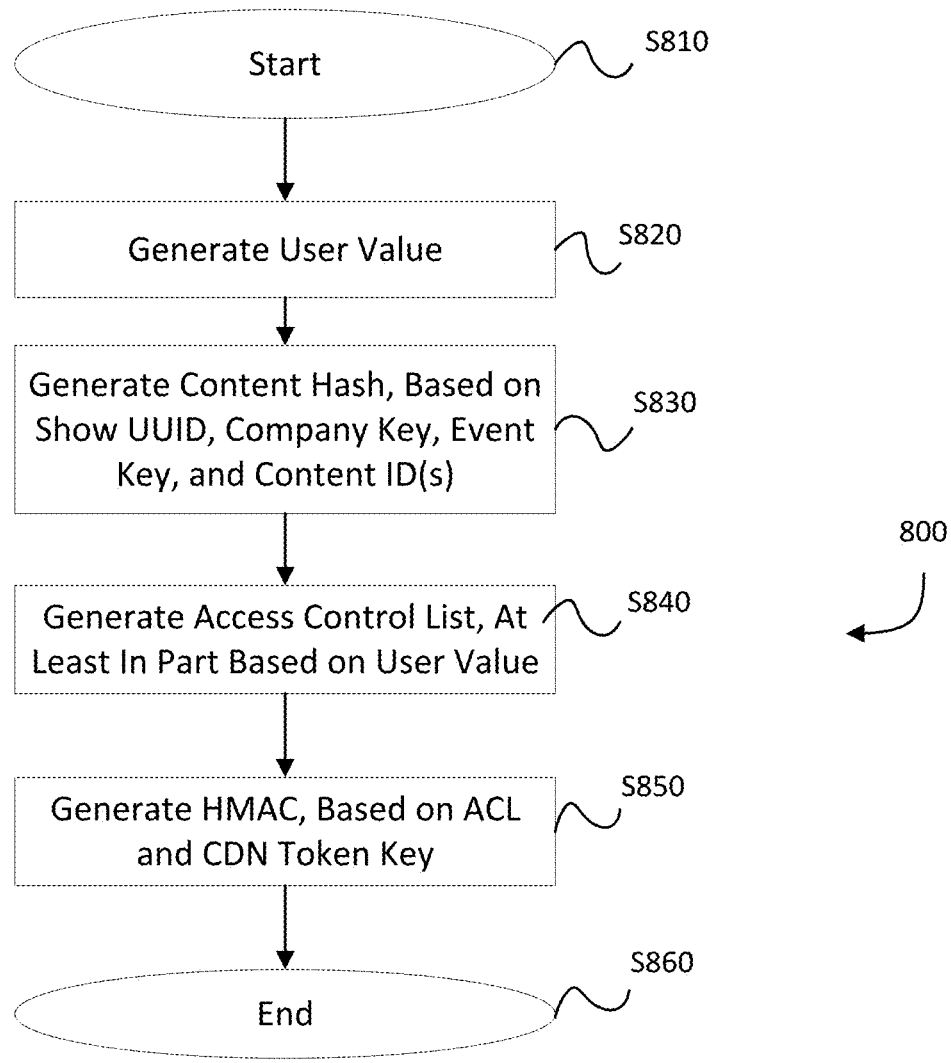
FIG. 8 illustrates an algorithm performed by a host to generate a hash-based message authentication code, according to an implementation of the present disclosure.

FIG. 8 illustrates an algorithm 800 performed by a host to generate a hash-based message authentication code, according to an implementation of the present disclosure.

Algorithm 800 begins at S810 and proceeds to S820. In S820, the processor of the host 120 generates a user value.

In some implementations in which the host 120 receives a user ID in the event registration, the processor of the host 120 determines a user key and a user type based on the user ID.

In other implementations, such as when the event registration does not include the user ID, the processor of the host 120 determines a user key in an arbitrary manner, such as randomly or sequentially. The processor of the host 120 can assign a generic user type, such as attendee.

In an implementation in which the event registration includes an event ID, the processor of the host 120 can determine a show UUID based on the event ID. In some implementations, the processor of the host 120 can determine the show UUID based on the user ID.

The processor of the host 120 then generates a user combination result based on the user key, the user value, and the show UUID. The processor of the host 120 can produce the user combination result by concatenating the user key, the user value, and the show UUID in a predetermined order. The processor of the host 120 then generates the user value by hashing the user combination result using, for example, Base 64. The algorithm 800 then advances to S830.

In S830, the processor of the host 120 generates one or more content hashes, based on the show UUID, a company key, an event key, and one or more content IDs. The processor of the host 120 can determine the company key and the event key based on the show UUID. The processor of the host 120 can determine the one or more content IDs, based on any of the show UUID, the event key, or, as appropriate, the event ID. In implementations involving a language locale for static content, the processor of the host 120 can determine the language locales based on a respective content ID for a respective content ID.

The processor of the host 120 then produces a hash combination result based on the show UUID, the company key, the event key, and a respective content ID. The processor of the host 120 can produce the hash combination result by concatenating the show UUID, the company key, the event key, and the respective content ID in a predetermined order. In some implementations, the hash combination result is also based on a language locale for the respective content ID. The processor of the host 120 then generates the content hash by hashing the hash combination result using, for example, Base 64. The algorithm 800 then advances to S840.

In S840, the processor of the host 120 generates an ACL, based on the user value. In many implementations, the processor of the host 120 generates the access control list also based on the one or more content hashes. For example, the processor of the host 120 can generate a text string including the user value and the one or more content hashes.

In some implementations, the text string includes a plurality of entries, where the plurality of entries include the user value and a respective one of the one or more content hashes. The plurality of entries can be delimited within the text string, such as by commas or semicolons.

In other implementations, the processor of the host 120 generates the access control list using a wildcard character instead of the one or more content hashes. Thus, the text string can include the user value and the wildcard character. The algorithm 800 then advances to S850.

In S850, the processor of the host 120 generates an HMAC based on the ACL and the CDN token key. For example, the processor of the host 120 hashes the ACL together with the CDN token key to produce the HMAC. In some implementations, this hashing is performed with SHA 256.

The algorithm 800 then advances to S860 and concludes.

Figure 9:
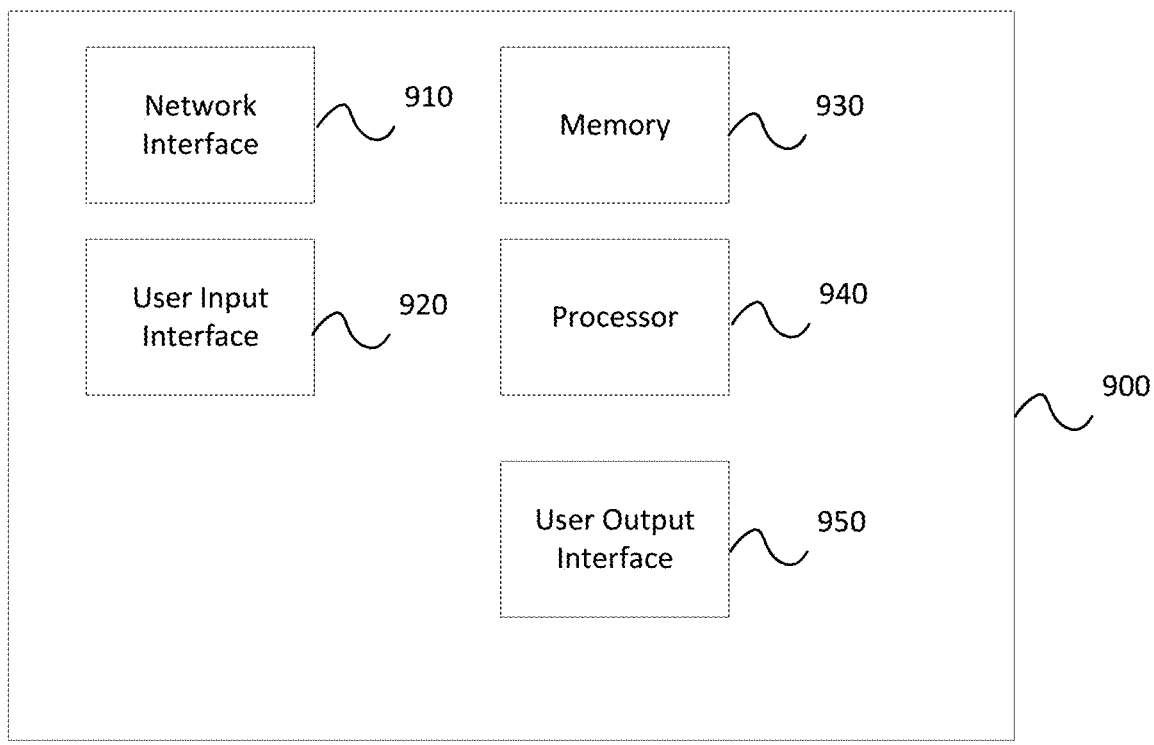
FIG. 9 illustrates a computing device, according to an implementation of the present disclosure.

FIG. 9 illustrates a computing device 900, according to an implementation of the present disclosure. The host 120, CDN 140, and clients 160A, 160B can be or include a computing device, as shown in FIG. 9.

Although illustrated within a single housing, computing device 900 can be distributed across plural housings or sub-systems that cooperate in executing program instructions. In some implementations, the computing device 900 can include one or more blade server devices, standalone server devices, personal computers, routers, hubs, switches, bridges, firewall devices, intrusion detection devices, mainframe computers, network-attached storage devices, smartphones and other mobile telephones, and other types of computing devices. The system hardware can be configured according to any computer architecture, such as a Symmetric Multi-Processing (SMP) architecture or a Non-Uniform Memory Access (NUMA) architecture.

The computing device 900 can include a network interface 910 that provides one or more communication connections and/or one or more devices that allow for communication between the computing device 900 and other computing systems (not shown) over a communication network or collection of networks (not shown) or the air. The network interface can communicate using near-field communications (NFC), Wi-Fi™, Bluetooth, Ethernet, facsimile, or any other wired or wireless interface.

The computing device 900 can also include a user input interface 920 that receives inputs from a human. The user input interface can be or include a mouse, a touchpad, a keyboard, a touchscreen, a trackball, a camera, a microphone, a joystick, a game controller, a scanner, or any other input device.

The computing device 900 can include a memory 930, also termed a "storage." The memory 930 can include or be one or more computer-readable storage media readable by a processor 940 and that store software. The memory 930 can be implemented as one storage device and can also be implemented across multiple co-located or distributed storage devices or sub-systems. The memory 930 can include additional elements, such as a controller, that communicate with the processor 940. The memory 930 can also include storage devices and/or sub-systems on which data and/or instructions are stored. The computing device 900 can access one or more storage resources to access information to carry out any of the processes indicated in this disclosure and, in particular, FIGS. 3 and 5-8.

The memory 930 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 930 can be or include resistive RAM (RRAM) or a magneto-resistive RAM (MRAM).

Software stored in memory 930 can include routines for at least partially performing at least one of the processes illustrated in FIGS. 3 and 5-8 and can be implemented in program instructions. Further, the software, when executed by the computing device 900 in general or the processor 940 specifically, can direct, among other functions, the computing device 900 or the processor 940 to perform the database layer caching as described herein.

The computing device 900 can include a processor 940. Processor 940 can be or include one or more hardware processors and/or other circuitry that retrieve and execute software from the memory 930. The processor 940 can be implemented within one processing device, chip, or package and can also be distributed across multiple processing devices, chips, packages, or sub-systems that cooperate in executing program instructions. In some implementations, the processor 940 is or includes a Graphics Processing Unit (GPU). The GPU can benefit the visual/image processing in the computing device 900. The GPU, or any second-order processing element independent from the processor 940 dedicated to processing imagery and other perception data in real or near real-time, can provide a benefit.

Processor 940 can have any register size, such as a 32-bit register or a 64-bit register, among others. Processor 940 can include multiple cores. Implementations of processor 940 are not limited to any particular number of threads. Processor 940 can be fabricated by any process technology, such as 14 nm process technology.

The computing device 900 can also include a user output interface 950 that outputs information to a human user. The user output interface 950 can be or include a display (e.g., a screen), a touchscreen, speakers, a printer, or a haptic feedback unit.

In implementations where the host 130 or CDN 140 includes multiple computing devices, a server of the system or, in a serverless implementation, a peer can use one or more communications networks that facilitate communication among the computing devices. For example, the one or more communications networks can include or be a local area network (LAN) or wide area network (WAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media," "computer-readable storage media," or "computer-readable storage medium" can refer to non-transitory storage media, such as a hard drive, a memory chip, and cache memory, and to transitory storage media, such as carrier waves or propagating signals.

Aspects of the system for database layer caching can be implemented in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various embodiments, different operations and portions of the operations of the methods described can be performed by different processing units. Furthermore, aspects of the present disclosure can take the form of a computer program product embodied in one or more computer-readable media having computer-readable program code embodied, e.g., encoded or stored, thereon. In various implementations, such a computer program can, for example, be downloaded (or updated) to existing devices and systems or be stored upon manufacturing of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The attached drawings depict spatial relationships between various components and to the spatial orientation of various aspects of components. The devices, components, members, and apparatuses can be positioned in any orientation. Thus, the use of terms such as "above", "below", "upper", "lower", "top", "bottom", or other similar terms to describe a spatial relationship between various components or to describe the spatial orientation of aspects of such components describes a relative relationship between the components or a spatial orientation of aspects of such components, respectively, as the components described can be oriented in any direction.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an associated electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, supporting chipsets, etc.) and computer-readable non-transitory memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application specific hardware of electronic devices. Implementations of the present disclosure can be readily included in a system-on-chip (SOC) package. An SOC represents an integrated circuit (IC) that integrates components of a computer or other electronic system into one chip. The SOC can contain digital, analog, mixed-signal, and often radio frequency functions that can be provided on one chip substrate. Other embodiments can include a multi-chip-module (MCM), with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In certain cases, it might be easier to describe one or more of the functionalities of a given set of flows by referencing a limited number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might or might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

Examples

In Example A1, an apparatus includes a network interface that receives a CDN token key and transmits event data including a content ID that identifies content within a webcast or a virtual event. The apparatus also includes a processor configured to generate a message authentication code, at least in part based on the content ID and the CDN token key. The event data identifies the message authentication code, and the network interface further transmits the content.

Example A2 is the apparatus of example A1, wherein the network interface receives an event registration that identifies a user ID for the webcast or virtual event, and the processor further is configured to generate the message authentication code, at least in part based on the user ID.

Example A3 is the apparatus of any of Examples A1-A2, wherein the processor further is configured to generate a content hash, at least in part based on the content ID, and to generate the message authentication code, at least in part based on the content hash.

Example A4 is the apparatus of any of Examples A1-A3, wherein the processor further is configured to generate an access control list, at least in part based on the content ID, and to generate the message authentication code, at least in part based on the access control list.

Example A5 is the apparatus of any of Examples A1-A4, wherein the network interface receives a CDN content request for the content and transmits the content, at least in part based on the CDN content request.

Example A6 is the apparatus of Example A5, wherein the network interface transmits the content, at least in part based on a determination that the CDN content request is valid.

Example A7 is the apparatus of Example A6, wherein the network interface receives an event registration that identifies a user ID for the webcast or virtual event, and the determination is at least in part based on the content ID and the user ID.

In Example A8, a non-transitory, computer-readable medium is encoded with instructions that, when executed by a computer, cause the computer to perform a method including: receiving a CDN token key; transmitting event data including a content ID that identifies content within a webcast or a virtual event; generating a message authentication code, at least in part based on the content ID and the CDN token key, wherein the event data identifies the message authentication code; and transmitting the content.

Example A9 is the medium of Example A8, the method further comprising: receiving an event registration that identifies a user ID for the webcast or virtual event; and generating the message authentication code, at least in part based on the user ID.

Example A10 is the medium of any of Examples A8-A9, the method further comprising: generating a content hash, at least in part based on the content ID; and generating the message authentication code, at least in part based on the content hash.

Example A11 is the medium of any of Examples A8-A9, the method further comprising: generating an access control list, at least in part based on the content ID; and generating the message authentication code, at least in part based on the access control list.

Example A12 is the medium of any of Examples A8-A11, the method further comprising: receiving a CDN content request for the content; and transmitting the content, at least in part based on the CDN content request.

Example A13 is the medium of Example A12, the method further comprising: transmitting the content, at least in part based on a determination that the CDN content request is valid.

Example A14 is the medium of Example A13, the method further comprising: receiving an event registration that identifies a user ID for the webcast or virtual event, wherein the determination is at least in part based on the content ID and the user ID.

In Example A15, a method is implemented by a host apparatus, the method including: receiving a CDN token key; transmitting event data including a content ID that identifies content within a webcast or a virtual event; generating a message authentication code, at least in part based on the content ID and the CDN token key, wherein the event data identifies the message authentication code; and transmitting the content.

Example A16 is the method of Example A15, further comprising: receiving an event registration that identifies a user ID for the webcast or virtual event; and generating the message authentication code, at least in part based on the user ID.

Example A17 is the method of any of Examples A15-A16, further comprising: generating a content hash, at least in part based on the content ID; and generating the message authentication code, at least in part based on the content hash.

Example A18 is the method of any of Examples A15-A17, further comprising: generating an access control list, at least in part based on the content ID; and generating the message authentication code, at least in part based on the access control list.

Example A19 is the method of any of Examples A15-A18, further comprising: receiving a CDN content request for the content; and transmitting the content, at least in part based on the CDN content request.

Example A20 is the method of Example A19, further comprising: transmitting the content, at least in part based on a determination that the CDN content request is valid.

Example A21 is the method of Example A20 wherein the network interface receives an event registration that identifies a user ID for the webcast or virtual event, and the determination is at least in part based on the content ID and the user ID.

In Example B1, an apparatus includes a storage to store content within a webcast or a virtual event; a network interface that transmits a CDN token key and receives a client content request including a first content hash and a message authentication code; and a processor configured to perform a decryption of the message authentication code, at least in part based on the CDN token key, and to perform a reverse hash on the content hash to obtain a content ID that identifies the content. The network interface transmits the content, at least in part based on the content ID.

Example B2 is the apparatus of Example B1, wherein the network interface transmits a CDN content request, at least in part based on a determination the content is not stored in the storage, and the network interface receives the content.

Example B3 is the apparatus of Example B2, wherein the CDN content request includes the content hash.

Example B4 is the apparatus of any of Examples B1-B3, wherein the client content request includes a first user value, the decryption produces a second user value, and the processor further is configured to perform a determination that the first user value matches the second user value.

Example B5 is the apparatus of Example B4, wherein the network interface further transmits the content, at least in part based on the determination that the first user value matches the second user value.

Example B6 is the apparatus of any of Examples B1-B5, wherein the decryption produces a second content hash, and the processor further is configured to perform a determination that the first content hash matches the second content hash.

Example B7 is the apparatus of any of Examples B1-B6, wherein the network interface further transmits the content, at least in part based on the determination that the first content hash matches the second content hash.

In Example B8, a non-transitory, computer-readable medium is encoded with instructions that, when executed by a computer, cause the computer to perform a method including: transmitting a CDN token key; receiving a client content request including a first content hash and a message authentication code; performing a decryption of the message authentication code, at least in part based on the CDN token key; performing a reverse hash on the content hash to obtain a content ID that identifies content within a webcast or a virtual event; and transmitting the content, at least in part based on the content ID.

Example B9 is the medium of Example B8, the method further comprising: transmitting a CDN content request, at least in part based on a determination the content is not stored in a storage; and receiving the content.

Example B10 is the medium of Example B9, wherein the CDN content request includes the content hash.

Example B11 is the medium of any of Examples B8-B10, wherein the client content request includes a first user value, the decryption produces a second user value; and the method further includes: performing a determination that the first user value matches the second user value.

Example B12 is the medium of Example B11, the method further comprising: transmitting the content, at least in part based on the determination that the first user value matches the second user value.

Example B13 is the medium of any of Examples B8-B12, wherein the decryption produces a second content hash, and the method further comprises: performing a determination that the first content hash matches the second content hash.

Example B14 is the medium of any of Examples B8-B13, the method further comprising: transmitting the content, at least in part based on the determination that the first content hash matches the second content hash.

In Example B15, a method includes: transmitting a CDN token key; receiving a client content request including a first content hash and a message authentication code; performing a decryption of the message authentication code, at least in part based on the CDN token key; performing a reverse hash on the content hash to obtain a content ID that identifies content within a webcast or a virtual event; and transmitting the content, at least in part based on the content ID.

Example B16 is the method of Example B15, further comprising: transmitting a CDN content request, at least in part based on a determination the content is not stored in a storage; and receiving the content.

Example B17 is the method of Example B16, wherein the CDN content request includes the content hash.

Example B18 is the method of any of Examples B15-B17, wherein the client content request includes a first user value, the decryption produces a second user value; and the method further includes: performing a determination that the first user value matches the second user value.

Example B19 is the method of Example B18, further comprising: transmitting the content, at least in part based on the determination that the first user value matches the second user value.

Example B20 is the method of any of Examples B15-B19, wherein the decryption produces a second content hash, and the method further comprises: performing a determination that the first content hash matches the second content hash.

Example B21 is the method of any of Examples B15-B20, further comprising: transmitting the content, at least in part based on the determination that the first content hash matches the second content hash.

In Example C1, an apparatus includes a network interface that receives event data that identifies a content ID and a message authentication code, wherein the content ID identifies a content within a webcast or a virtual event; and a processor configured to generate a content hash, at least in part based on the content ID. The network interface transmits a content request and receives the content, and the content request identifies the content hash and the message authentication code.

Example C2 is the apparatus of Example C1, wherein the network interface transmits an event registration that identifies an address of the client apparatus.

Example C3 is the apparatus of Example C2, wherein the event data identifies a user value, and the content request identifies the user value.

Example C4 is the apparatus of any of Examples C2-C3, wherein the event registration includes an event ID to identify the webcast or the virtual event.

Example C5 is the apparatus of any of Examples C1-C4, wherein the event data identifies a company key, a show ID, and an event key, and the processor further is configured to generate the content hash, at least in part based on the company key, the show ID, and the event key.

Example C6 is the apparatus of any of Examples C1-C5, further comprising: a display that displays the content.

Example C7 is the apparatus of Example C6, further comprising: a user input interface, wherein the event data identifies a preview image or title of the content ID, the event data further identifies a plurality of content IDs including the content ID, the display performs a display of the preview image or title, the apparatus receives an input from the user input interface, at least in part based on the display of the preview image or title, and the processor further is configured to generate the content hash, at least in part based on the input.

In Example C8, a non-transitory, computer-readable medium is encoded with instructions that, when executed by a computer, cause the computer to perform a method including: receiving event data that identifies a content ID and a message authentication code, wherein the content ID identifies a content within a webcast or a virtual event; generating a content hash, at least in part based on the content ID; transmitting a content request; and receiving the content. The content request identifies the content hash and the message authentication code.

Example C9 is the medium of Example C8, the method further comprising: transmitting an event registration that identifies an address of the computer.

Example C10 is the medium of Example C9, wherein the event data identifies a user value, and the content request identifies the user value.

Example C11 is the medium of any of Examples C9-C10, wherein the event registration includes an event ID to identify the webcast or the virtual event.

Example C12 is the medium of any of Examples C8-C11, wherein the event data identifies a company key, a show ID, and an event key, and the method further includes: generating the content hash, at least in part based on the company key, the show ID, and the event key.

Example C13 is the medium of any of Examples C8-C12, the method further comprising: displaying, on a display, the content.

Example C14 is the medium of Example C13, wherein the event data identifies a preview image or title of the content ID, the event data further identifies a plurality of content IDs including the content ID, and the method further comprises: displaying, on the display, the preview image or title; receiving an input from a user input interface, at least in part based on the displaying the preview image or title; and generating the content hash, at least in part based on the input.

In Example C15, a method includes: receiving event data that identifies a content ID and a message authentication code, wherein the content ID identifies a content within a webcast or a virtual event; generating a content hash, at least in part based on the content ID; transmitting a content request; and receiving the content. The content request identifies the content hash and the message authentication code.

Example C16 is the method of Example C15, further comprising: transmitting an event registration that identifies an address of the computer.

Example C17 is the method of Example C16, wherein the event data identifies a user value, and the content request identifies the user value.

Example C18 is the method of any of Examples C16-C17, wherein the event registration includes an event ID to identify the webcast or the virtual event.

Example C19 is the method of any of Examples C15-C18, wherein the event data identifies a company key, a show ID, and an event key, and the method further includes: generating the content hash, at least in part based on the company key, the show ID, and the event key.

Example C20 is the method of any of Examples C15-C19, further comprising: displaying, on a display, the content.

Example C21 is the method of Example C20, wherein the event data identifies a preview image or title of the content ID, the event data further identifies a plurality of content IDs including the content ID, and the method further comprises: displaying, on the display, the preview image or title; receiving an input from a user input interface, at least in part based on the displaying the preview image or title; and generating the content hash, at least in part based on the input.

I claim:

1. An apparatus, comprising:
   a storage to store content within a webcast or a virtual event;
   a network interface that transmits a Content Delivery Network (CDN) token key and receives a client content request including a first content hash and a message authentication code; and
   a processor configured to perform a decryption of the message authentication code, at least in part based on the CDN token key, and to perform a reverse hash on the first content hash to obtain a content ID that identifies the content, wherein the network interface transmits the content, at least in part based on the content ID.

2. The apparatus of claim 1, wherein the network interface transmits a CDN content request, at least in part based on a determination the content is not stored in the storage, the CDN content request includes the first content hash, and the network interface receives the content.

3. The apparatus of claim 1, wherein the client content request includes a first user value, the decryption produces a second user value, and the processor further is configured to perform a determination that the first user value matches the second user value.

4. The apparatus of claim 3, wherein the network interface further transmits the content, at least in part based on the determination that the first user value matches the second user value.

5. The apparatus of claim 1, wherein the decryption produces a second content hash, and the processor further is configured to perform a determination that the first content hash matches the second content hash.

6. The apparatus of claim 5, wherein the network interface further transmits the content, at least in part based on the determination that the first content hash matches the second content hash.

7. The apparatus of claim 1, wherein the first content hash includes a hash of a show identifier, a company key, an event key, and the content ID, the show identifier is a randomized string, the company key identifies a tenant of the apparatus, and the event key is associated with a presentation within an environment.

8. A non-transitory, computer-readable medium encoded with instructions that, when executed by a computer, cause the computer to perform a method including:
   transmitting a CDN token key;
   receiving a client content request including a first content hash and a message authentication code;
   performing a decryption of the message authentication code, at least in part based on the CDN token key;
   performing a reverse hash on the first content hash to obtain a content ID that identifies content within a webcast or a virtual event; and
   transmitting the content, at least in part based on the content ID.

9. The medium of claim 8, the method further comprising:
   transmitting a CDN content request, at least in part based on a determination the content is not stored in a storage, wherein the CDN content request includes the first content hash; and
   receiving the content.

10. The medium of claim 8, the method further comprising:
    performing a determination that a first user value matches a second user value, wherein the client content request includes the first user value, and the decryption produces the second user value.

11. The medium of claim 10, wherein the content is transmitted, at least in part based on the determination that the first user value matches the second user value.

12. The medium of claim 8, the method further comprising:
    performing a determination that the first content hash matches a second content hash, wherein the decryption produces the second content hash.

13. The medium of claim 12, wherein the content is transmitted, at least in part based on the determination that the first content hash matches the second content hash.

14. The medium of claim 8, wherein the first content hash includes a hash of a show identifier, a company key, an event key, and the content ID, the show identifier is a randomized string, the company key identifies a tenant of the computer, and the event key is associated with a presentation within an environment.

15. A method implemented by a computing device, the method comprising:
   transmitting a CDN token key;
   receiving a client content request including a first content hash and a message authentication code;
   performing a decryption of the message authentication code, at least in part based on the CDN token key;
   performing a reverse hash on the first content hash to obtain a content ID that identifies content within a webcast or a virtual event; and
   transmitting the content, at least in part based on the content ID.

16. The method of claim 15, further comprising:
   transmitting a CDN content request, at least in part based on a determination the content is not stored in a storage of the computing device, the CDN content request including the first content hash; and
   receiving the content.

17. The method of claim 15, further comprising:
   performing a determination that a first user value matches a second user value, wherein the client content request includes the first user value, and the decryption produces the second user value.

18. The method of claim 17, wherein the content is transmitted, at least in part based on the determination that the first user value matches the second user value.

19. The method of claim 15, further comprising:
   performing a determination that the first content hash matches a second content hash, wherein the decryption produces the second content hash, and the content is transmitted, at least in part based on the determination that the first content hash matches the second content hash.

20. The method of claim 15, wherein the first content hash includes a hash of a show identifier, a company key, an event key, and the content ID, the show identifier is a randomized string, the company key identifies a tenant of the computing device, and the event key is associated with a presentation within an environment.

* * * * *